US011233551B2

(12) United States Patent
Ye et al.

(10) Patent No.: US 11,233,551 B2
(45) Date of Patent: Jan. 25, 2022

(54) DYNAMICALLY ENABLING AND DISABLING MULTIPLEXING OF HARQ-ACK FEEDBACK FOR DIFFERENT TYPES OF TRAFFIC

(71) Applicant: Nokia Technologies Oy, Espoo (FI)

(72) Inventors: Sigen Ye, Whitehouse Station, NJ (US); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 86 days.

(21) Appl. No.: 16/716,200

(22) Filed: Dec. 16, 2019

(65) Prior Publication Data

US 2020/0228173 A1 Jul. 16, 2020

Related U.S. Application Data

(60) Provisional application No. 62/791,505, filed on Jan. 11, 2019.

(51) Int. Cl.
*H04B 7/0456* (2017.01)
*H04L 1/18* (2006.01)
(Continued)

(52) U.S. Cl.
CPC ......... *H04B 7/0478* (2013.01); *H04L 1/1819* (2013.01); *H04L 1/1854* (2013.01); *H04L 5/0055* (2013.01); *H04W 72/0413* (2013.01)

(58) Field of Classification Search
CPC ... H04B 7/0478; H04L 1/1819; H04L 1/1854; H04L 5/0055
See application file for complete search history.

(56) References Cited

U.S. PATENT DOCUMENTS 10,951,363 B2 * 3/2021 Hosseini ............... H04L 1/1685
11,013,063 B2 * 5/2021 Kwon ................... H04L 1/1819
(Continued)

FOREIGN PATENT DOCUMENTS

WO 2017/177083 A1 10/2017
WO 2018/009548 A1 1/2018
(Continued)

OTHER PUBLICATIONS

Extended European Search Report received for corresponding European Patent Application No. 20150421.4, dated Jun. 12, 2020, 11 pages.
(Continued)

*Primary Examiner* — Jamal Javaid
*Assistant Examiner* — Ryan C Kavleski
(74) *Attorney, Agent, or Firm* — Squire Patton Boggs (US) LLP

(57) ABSTRACT

According to a first embodiment, a method may include receiving, by a user equipment, at least one downlink assignment indicating at least one multiplexing group indicator. The method may further include generating, by the user equipment, at least one hybrid automatic repeat request acknowledgement codebook in a sub-slot for each received multiplexing group indicator value. The method may further include determining, by the user equipment, whether more than one PUCCH resource associated with more than one multiplexing group indicator overlaps in time. The method may further include transmitting, by the user equipment, the highest priority codebook on the determined PUCCH resource and preventing, by the user equipment, transmission of the lower-priority HARQ-ACKs based on the at least one MGI indication in case an overlap in time has been determined. The method may further include transmitting,
(Continued)

by the user equipment, the generated codebook on the determined PUCCH resource.

17 Claims, 9 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2018/0279291 A1 | 9/2018 | Tiirola et al. | |
| 2018/0310257 A1* | 10/2018 | Papasakellariou | H04W 52/50 |
| 2018/0368169 A1 | 12/2018 | Jung et al. | |
| 2019/0363843 A1* | 11/2019 | Gordaychik | H04L 1/1854 |
| 2021/0075558 A1* | 3/2021 | Takeda | H04W 72/0446 |

FOREIGN PATENT DOCUMENTS

| | | |
|---|---|---|
| WO | 2018/204491 A1 | 11/2018 |
| WO | 2018/231971 A1 | 12/2018 |

OTHER PUBLICATIONS

"On enhanced HARQ-ACK feedback for URLLC", 3GPP TSG RAN WG1 Meeting #94-bis, R1-1810667, Agenda : 7.2.6.5, Nokia, Oct. 8-12, 2018, 4 pages.

"Discussion on eMBB and URLLC UCI multiplexing", 3GPP TSG RAN WG1 Meeting #93, R1-1806064, Agenda : 7.1.3.2.3, vivo, May 21-25, 2018, pp. 1-4.

European Office Action issued in corresponding European Patent Application No. 20 150 421.4-1205 dated Oct. 28, 2021.

"Offline Summary on UCI Enhancements for URLLC", 3GPP TSG-RAN WG1 meeting #95, R1-1814273, Agenda 7.2.6.1.2, OPPO, Nov. 12-16, 2018, 8 pages.

"On UCI Enhancements for URLLC", 3GPP TSG-RAN WG1 meeting #95, R1-1813114, Agenda: 7.2.6.1.2, Nokia, Nov. 12-16, 2018, 10 pages.

"Discussion on HARQ-ACK Feedback over PUCCH and PUSCH", 3GPP TSG-RAN WG1 meeting #95, R1-1812414, Agenda: 7.2.6. 1.2, Fujitsu, Nov. 12-16, 2018, pp. 1-6.

"UL Control Enhancements for URLLC", 3GPP TSG-RAN WG1 meeting #95, R1-1812385, Agenda: 7.2.6.1.2, ZTE, Nov. 12-16, 2018, pp. 1-7.

"UCI Enhancements for URLLC", 3GPP TSG-RAN WG1 meeting #95, R1-1812222, Agenda: 7 2 6 1.2, Huawei, Nov. 12-16, 2018, 8 pages.

"UL Control Enhancements for URLLC", 3GPP TSG-RAN WG1 meeting #95, R1-1812629, Agenda: 7.2.6.1.2, CATT, Nov. 12-16, 2018, 7 pages.

"New Services & Applications with 5G Ultra-reliable Low Latency Communications", 5G Americas, Nov. 2018, 60 pages.

* cited by examiner

DYNAMICALLY ENABLING AND DISABLING MULTIPLEXING OF HARQ-ACK FEEDBACK FOR DIFFERENT TYPES OF TRAFFIC

CROSS REFERENCE TO RELATED APPLICATIONS

This application claims priority from U.S. Provisional Application No. 62/791,505, filed on Jan. 11, 2019. The entire contents of this earlier filed application are hereby incorporated by reference in their entirety.

BACKGROUND

Field

Various communication systems may benefit from dynamic enabling and disabling of multiplexing of HARQ-ACK bits for different types of traffic.

Description of the Related Art

3rd Generation Partnership Project (3GPP) technologies include the ability to support different types of traffic with various range of requirements on latency, reliability, etc. This sometimes requires the prioritization of handling some traffic, such as ultra-reliable low-latency communication (URLLC) in new radio (NR), over some other traffic, such as enhanced mobile broadband (eMBB) in NR. Another example is the prioritization of transmission control protocol (TCP)-acknowledgement (ACK) messages on a 3GPP air interface, which may be important for TCP throughput. In NR release (Rel)-15, only one transmission opportunity for hybrid automatic repeat request acknowledgement (HARQ-ACK) feedback may be supported within a slot, either on physical downlink control channel (PDCCH) or physical downlink shared channel (PUSCH). As part of the uplink control information (UCI) enhancements in Rel-16 ultra-reliable low-latency communication (URLLC), enhanced HARQ-ACK feedback may support an increased number of HARQ-ACK transmission opportunities within a slot.

SUMMARY

In a first aspect thereof the exemplary embodiments of this invention provide a method that comprises receiving, by a user equipment, at least one downlink assignment indicating at least one multiplexing indicator and at least one physical uplink control channel resource in at least one sub-slot; determining, based on the multiplexing indicator of the last received downlink assignment, if hybrid automatic repeat request acknowledgement bits of a first traffic type and a second traffic type are to be multiplexed; generating at least one hybrid automatic repeat request acknowledgement codebook associated with the hybrid automatic repeat request acknowledgement bits of the first traffic type in response to determining that the hybrid automatic repeat request acknowledgement bits of the first traffic type and the second traffic type are not to be multiplexed; and transmitting at least one physical uplink control channel comprising the at least one generated hybrid automatic repeat request acknowledgement codebook.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to receive at least one downlink assignment indicating at least one multiplexing indicator and at least one physical uplink control channel resource in at least one sub-slot; determine, based on the multiplexing indicator of the last received downlink assignment, if hybrid automatic repeat request acknowledgement bits of a first traffic type and a second traffic type are to be multiplexed; generate at least one hybrid automatic repeat request acknowledgement codebook associated with the hybrid automatic repeat request acknowledgement bits of the first traffic type in response to determining that the hybrid automatic repeat request acknowledgement bits of the first traffic type and the second traffic type are not to be multiplexed; and transmit at least one physical uplink control channel comprising the at least one generated hybrid automatic repeat request acknowledgement codebook.

In another aspect thereof the exemplary embodiments of this invention provide an apparatus that comprises at least one data processor and at least one memory that includes computer program code. The at least one memory and computer program code are configured, with the at least one data processor, to cause the apparatus, at least to determine at least one multiplexing indicator depending on whether the hybrid automatic repeat request acknowledgement for a first traffic type and a second traffic type can be multiplexed; and transmit at least one downlink assignment indicating the determined at least one multiplexing indicator and at least one physical uplink control channel resource in at least one sub-slot.

BRIEF DESCRIPTION OF THE DRAWINGS

For proper understanding of this disclosure, reference should be made to the accompanying drawings, wherein.

DETAILED DESCRIPTION

Figure 1A:
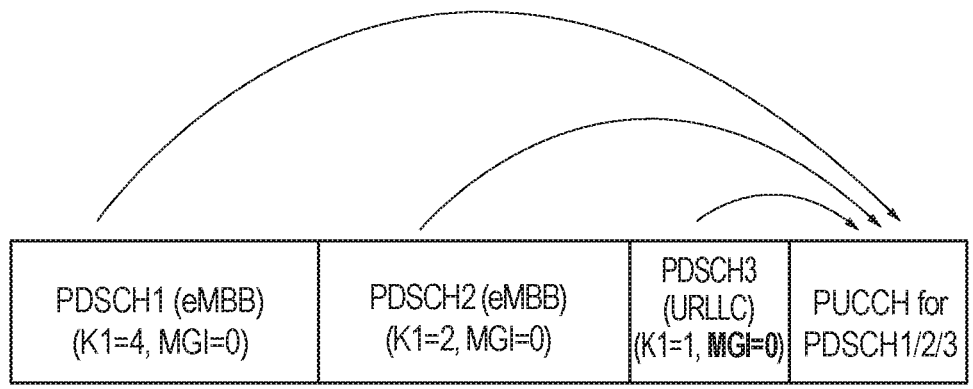
FIG. 1A and FIG. 1B illustrate an example of dynamic multiplexing of URLLC and eMBB HARQ-ACK using a multiplexing group indicator according to certain embodiments.

User equipment (UE) may need to handle HARQ-ACK feedback for multiple types of traffic, such as ultra-reliable low latency communication (URLLC) and enhanced mobile broadband (eMBB). For example, separate HARQ-ACK procedures and/or codebooks may be used for URLLC and eMBB traffic, but challenges may arise when multiplexing HARQ-ACKs for URLLC and eMBB traffic.

Where HARQ-ACK multiplexing of URLLC and eMBB traffic does not degrade performance standards, such as latency and/or reliability, it may be beneficial for URLLC and eMBB traffic to use HARQ-ACK multiplexing to simultaneously transmit URLLC and eMBB HARQ-ACK, and would not lead to eMBB performance degradation. Alternatively, the HARQ-ACK transmission for eMBB may be dropped when the required performance of URLLC HARQ-ACK cannot be assured when being multiplexed in conjunction with eMBB HARQ-ACK, and in this case, only the URLLC HARQ-ACK would be transmitted.

HARQ-ACK multiplexing of URLLC and eMBB may be enabled and/or disabled either semi-statically or dynamically. Dynamic enabling and/or disabling of the HARQ-ACK multiplexing may be performed according to an indication in the downlink assignment, while also providing another level of flexibility compared to semi-static signaling, such as allowing the multiplexing only if the total payload size is small enough to not impact the latency and/or reliability performance. Such dynamic operation may result in a more efficient system operation.

Current techniques related to HARQ-ACK multiplexing of URLLC and eMBB traffic may come with various disadvantages. For example, a base station may determine whether or not the HARQ-ACK of the eMBB and the URLLC can be multiplexed in one HARQ-ACK codebook, and the multiplexing may be enabled by having URLLC HARQ-ACK point to the same PUCCH resource as eMBB HARQ-ACK. However, the PUCCH resource may not be updated or overridden once indicated, which may be challenging for the network entity since the network entity cannot predict the future scheduling. Furthermore, grouping PDSCH may support multiple HARQ-ACK transmission opportunities in a slot, such as by using explicit signalling with additional bits for the PDSCH group indicator in the DCI. The PDSCH group indicator may be used to determine which PDSCH have HARQ-ACK multiplexed together, and each group may correspond to one HARQ-ACK transmission opportunity in a slot.

Certain embodiments described herein may have various benefits and/or advantages to overcome the disadvantages described above by providing dynamic enabling and/or disabling of multiplexing of HARQ-ACK bits for different types of traffic. For example, at least one additional bit may be added for the needed indication to the DCI and/or DL assignment message, and may also define the corresponding UE behavior. In particular, the additional bits may carry a multiplexing group indicator (MGI), while the UE may only multiplex the HARQ-ACK bits for the DL assignments with a matching multiplexing group indicator. Where there are multiple groups of HARQ-ACK bits, and priorities are needed to select at least one group, priorities may also be defined for each multiplexing group indicator. As a result, certain embodiments may result in improved reliability and latency. Thus, certain embodiments are directed to improvements in computer-related technology.

In various embodiments, one bit may be added in the DL assignment that indicates whether multiplexing of eMBB and/or URLLC HARQ-ACK in the same HARQ-ACK codebook transmission should be performed or not. For example, a bit in the last DCI message/DL assignment corresponding to the generated HARQ-ACK codebook bits to be transmitted at the same time, such as overlap/collision in time, may define a HARQ-ACK multiplexing rule that applies for different types of traffic.

PUCCH slots may be divided into multiple sub-slots, where time units may now be sub-slots instead of slots to provide multiple PUCCH or HARQ-ACK transmission opportunities per slot. Thus, for all PDSCHs that are associated with PUCCH resources within the same sub-slot, the related HARQ-ACK bits may be multiplexed, and the PUCCH resource to be used may be determined by the PUCCH resource indicator in the last received DL assignment pointing to the same PUCCH sub-slot. When applied to the sub-slot based HARQ-ACK feedback operation, certain embodiments described herein may allow multiple HARQ-ACK transmissions with a single slot, while also allowing the dynamic enabling/disabling of multiplexing of HARQ-ACK bits for eMBB and URLLC.

Figure 1B:
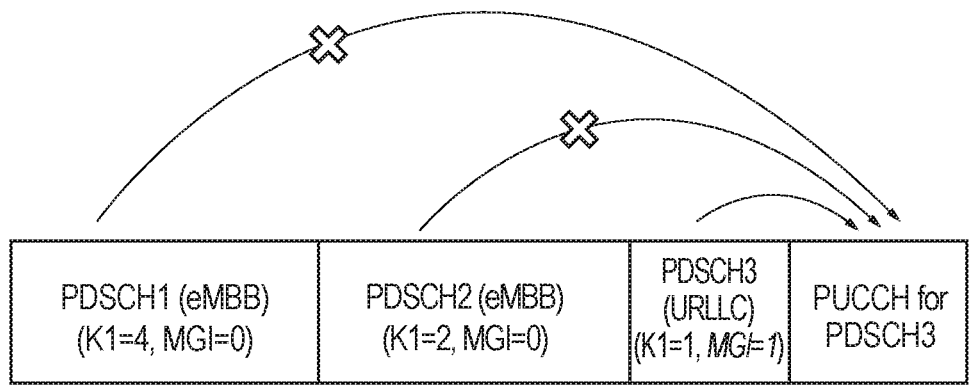

FIG. 1A, FIG. 1B illustrate an example of dynamic multiplexing of URLLC and eMBB HARQ-ACK using a multiplexing group indicator (MGI). In some embodiments, PDSCHs indicating at least one PUCCH resource in the same sub-slot may be scheduled. For example, K1 may be a HARQ-ACK feedback delay relative to the end of the PDSCH transmission in the unit of a sub-slot, with a sub-slot length of 7 symbols and/or half-slot. PDSCH1 and PDSCH2 for eMBB may be associated with a first MGI, such as 0. The MGI may be set to a first MGI for all PDSCHs, as shown in FIG. 1A. Thus, the HARQ-ACK bits for all 3 PDSCHs may be multiplexed together and transmitted on a PUCCH or PUSCH. In contrast, FIG. 1B illustrates PDSCH3 scheduled with a second MGI, such as 1. The UE may generate a separate HARQ-ACK codebook for PDSCH3 to be transmitted on one PUCCH, with another HARQ-ACK codebook for PDSCH1/PDSCH2 to be transmitted on another PUCCH. Lower priority HARQ-ACK information may be associated with a lower multiplexing group indicator, and higher priority HARQ-ACK information may be associated with a larger multiplexing group indicator (i.e., MGI=1 having priority over MGI=0). In this example, the UE may only transmit one PUCCH in a sub-slot, and PUCCH for PDSCH3 HARQ-ACK may be transmitted, while PUCCH for PDSCH1/PDSCH2 HARQ-ACK may be dropped.

In certain embodiments, one or more bits may be added in each downlink assignment as a multiplexing group indicator (MGI). For all of the DL assignments which indicate the PUCCH resource in the same sub-slot and the same MGI, the HARQ-ACK bits for these PDSCHs are multiplexed on the same PUCCH (or PUSCH). Where there are multiple PUCCHs for HARQ-ACK in the same sub-slot correspond to different MGIs, prioritization may be applied when the UE cannot transmit all the PUCCHs simultaneously. For example, PUCCH carrying URLLC HARQ-ACK may be prioritized over PUCCH carrying eMBB HARQ-ACK. Alternatively, priorities are defined for each MGI, and PUCCH corresponding to the MGI with the higher priority may be prioritized.

Figure 2:
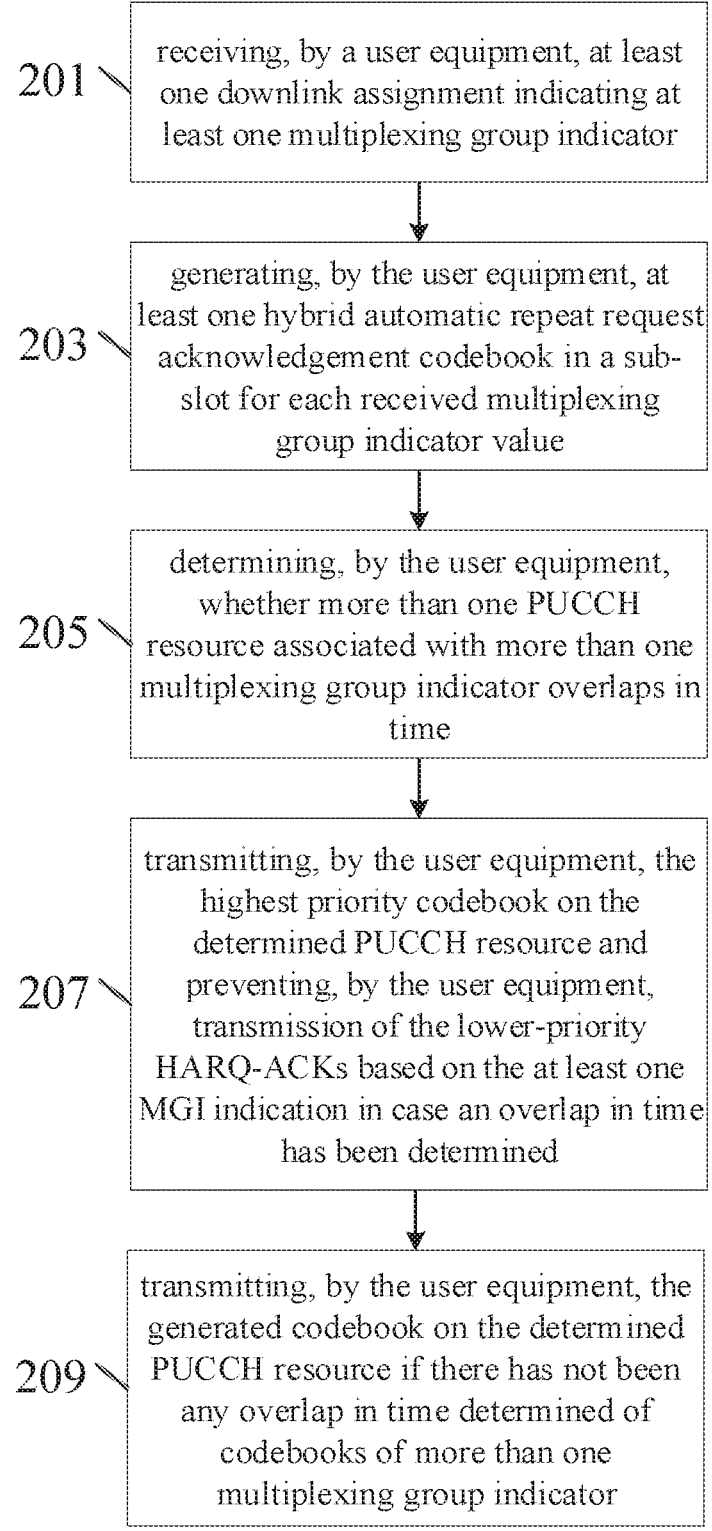
FIG. 2 illustrates an example of a method performed by a user equipment according to certain embodiments.
Figure 9:
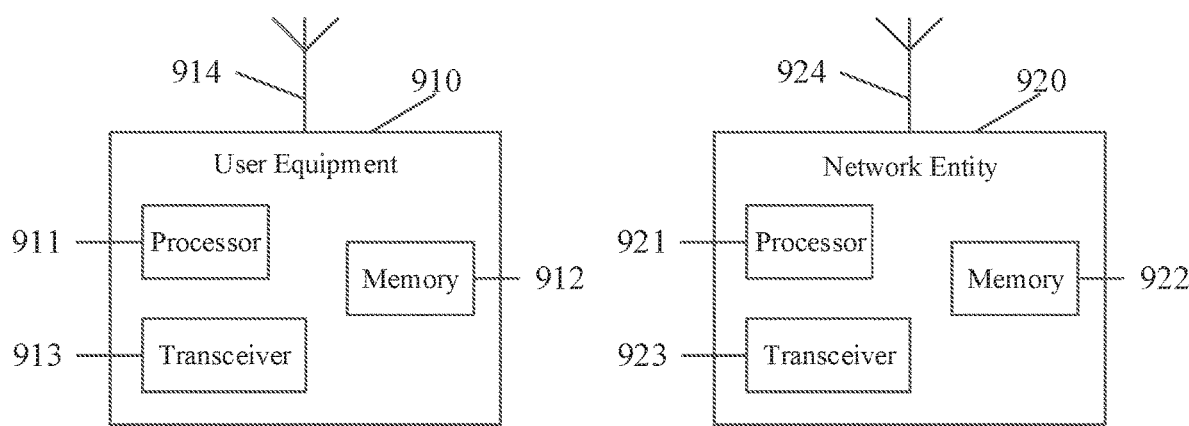
FIG. 9 illustrates another example of a system according to certain embodiments.

Using the technique illustrated in FIG. 1A, FIG. 1B, and FIG. 2 illustrates an example of a method performed by a user equipment, such as user equipment 910 illustrated in FIG. 9, according to certain embodiments. In step 201, the user equipment may receive at least one downlink assignment indicating at least one multiplexing group indicator. In step 203, the user equipment may generate at least one hybrid automatic repeat request acknowledgement codebook in a sub-slot for each received multiplexing group indicator value. If there is only one received multiplexing group indicator value, the user equipment may transmit the generated codebook on the determined PUCCH resource. In step 205, the user equipment may determine whether more than one PUCCH resource associated with more than one multiplexing group indicator overlaps in time. In step 207, the user equipment may transmit the highest priority codebook on the determined PUCCH resource and may prevent transmission of the lower-priority HARQ-ACKs based on the at least one MGI indication in case an overlap in time has been determined. In step 209, the user equipment may transmit the generated codebook on the determined PUCCH resource if there has not been any overlap in time determined of codebooks of more than one multiplexing group indicator.

Figures 3A, 3B:
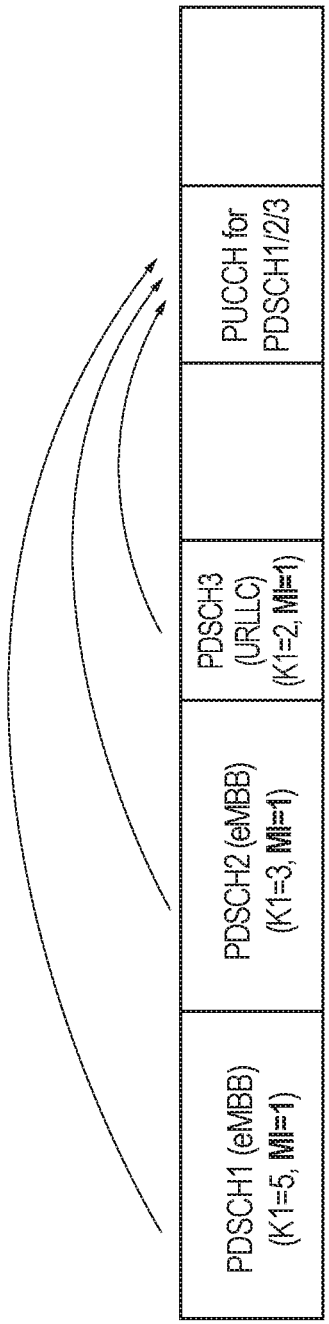
FIG. 3A and FIG. 3B illustrate an example of dynamic multiplexing of URLLC and eMBB HARQ-ACK using a multiplexing indicator (MI) according to certain embodiments.

FIG. 3A, FIG. 3B illustrate another example of dynamic multiplexing of URLLC and eMBB HARQ-ACK using a multiplexing indicator (MI). For the two eMBB PDSCHs (PDSCH1 and PDSCH2) and the first URLLC PDSCH (PDSCH3), the MI may be set to 1. The network entity may have previously considered the multiplexing performance acceptable. Where no further PDSCH is transmitted which requires HARQ-ACK feedback, as shown in FIG. 3A, the HARQ-ACK of the two eMBB PDSCHs (PDSCH1 and PDSCH2) and the HARQ-ACK of the URLLC PDSCH (PDSCH3) may be multiplexed together on PUCCH (or PUSCH) in sub-slot 6. When the network entity schedules another URLLC PDSCH4, as in FIG. 3B, the multiplexing indicator may be set to 0 in order to prevent multiplexing of URLLC and eMBB HARQ-ACK because, for example, the overall payload size exceeds a certain threshold. Thus, in FIG. 3B, the UE may drop the HARQ-ACK of eMBB PDSCHs (PDSCH1 and PDSCH2) and only map the HARQ-ACK of the URLLC PDSCHs (PDSCH 3 and PDSCH4) on the PUCCH (or PUSCH) in half-slot 6. Thus, the network entity may dynamically modify the multiplexing decision as the PDSCH scheduling progresses. In some embodiments, it may be desirable to distinguish high priority (URLLC) traffic from lower priority (eMBB) traffic to perform the intended HARQ-ACK multiplexing prioritization. There may be a separate mechanism for URLLC and eMBB traffic differentiation. For example, the required traffic differentiation may be done either explicitly in DCI, or implicitly by other means.

Figure 4:
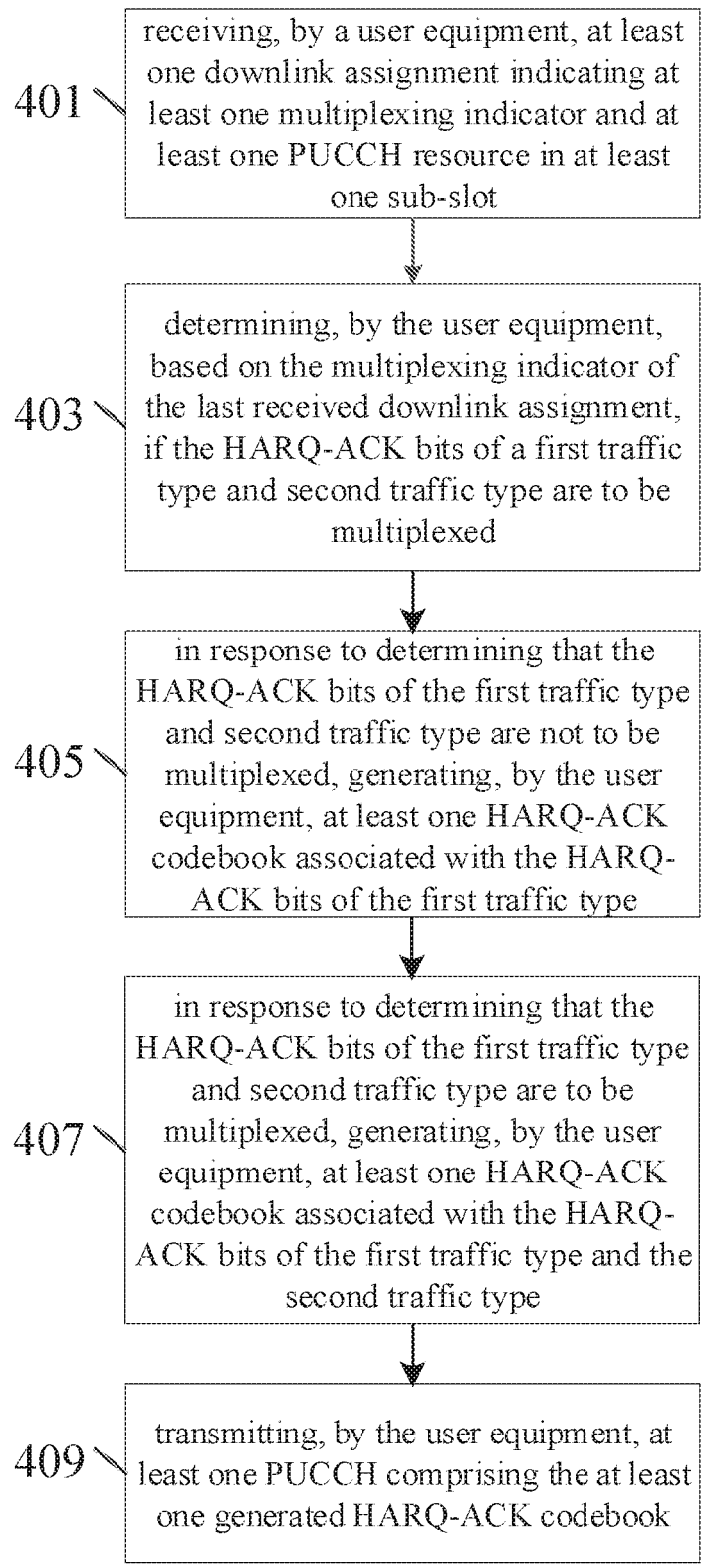
FIG. 4 illustrates another example of a method performed by a user equipment according to certain embodiments.

Using the technique illustrated in FIG. 3A, FIG. 3B, and FIG. 4 illustrates an example of a method performed by a user equipment, such as user equipment 910 illustrated in FIG. 9, according to certain embodiments. HARQ-ACK procedure for URLLC and eMBB may be associated with sub-slot based techniques where URLLC and eMBB traffic is differentiated, either explicitly, such as in DCI, or implicitly. For example, a one-bit multiplexing indicator (MI) may be added in the downlink assignment indicating whether URLLC and eMBB HARQ-ACK bits are multiplexed or not. In some embodiments, a first value, such as 0, may indicate no multiplexing of URLLC and eMBB HARQ-ACK, while a second value, such as 1, may indicate multiplexing of URLLC and eMBB HARQ-ACK. The bit in the last downlink assignment may indicate that the PUCCH resource in the sub-slot may determine whether multiplexing is performed. Thus, a network entity may adjust the last bit, and whether multiplexing is performed, until a scheduling decision of the last PDSCH, with the PUCCH resource associated with the same sub-slot.

In some embodiments, when HARQ-ACK bits for different types of traffic are multiplexed together, there may be different ways/orders to multiplex them. For example, URLLC HARQ-ACK bits may be followed by eMBB HARQ-ACK bits, where they can be either jointly encoded or separately encoded. Alternatively, the HARQ-ACK bits may be concatenated according to time, regardless of the traffic type, such as according to Rel-15 HARQ-ACK procedure.

In step 401, a user equipment may receive at least one downlink assignment indicating at least one multiplexing indicator and at least one PUCCH resource in at least one sub-slot. In step 403, the user equipment may determine, based on the multiplexing indicator of the last received downlink assignment, if the HARQ-ACK bits of a first traffic type and second traffic type are to be multiplexed. In some embodiments, the first traffic type may be URLLC, and the second traffic type may be eMBB.

In step 405, in response to determining that the HARQ-ACK bits of the first traffic type and second traffic type are not to be multiplexed the user equipment may generate at least one HARQ-ACK codebook associated with the HARQ-ACK bits of the first traffic type. In some embodiments, in response to determining that the first traffic type and second traffic type are not to be multiplexed, the HARQ-ACK codebook may only be associated with URLLC PDSCH HARQ-ACK. Alternatively, in response to determining that the first traffic type and second traffic type are to be multiplexed, the HARQ-ACK codebook may be associated with URLLC and eMBB PDSCH HARQ-ACK.

In some embodiments, a first determined indicator may cause all HARQ-ACK bits to be multiplexed together and/or transmitted on PUSCH or using the indicated PUCCH resource. A second determined indicator may cause the eMBB HARQ-ACK to be dropped and/or only transmit the URLLC HARQ-ACK in the sub-slot on PUCCH or PUSCH. In step 407, in response to determining that the HARQ-ACK bits of the first traffic type and second traffic type are to be multiplexed the user equipment may generate at least one HARQ-ACK codebook associated with the HARQ-ACK bits of the first traffic type and the second traffic type. In step 409, the user equipment may transmit at least one PUCCH comprising the at least one generated HARQ-ACK codebook.

Figure 5:
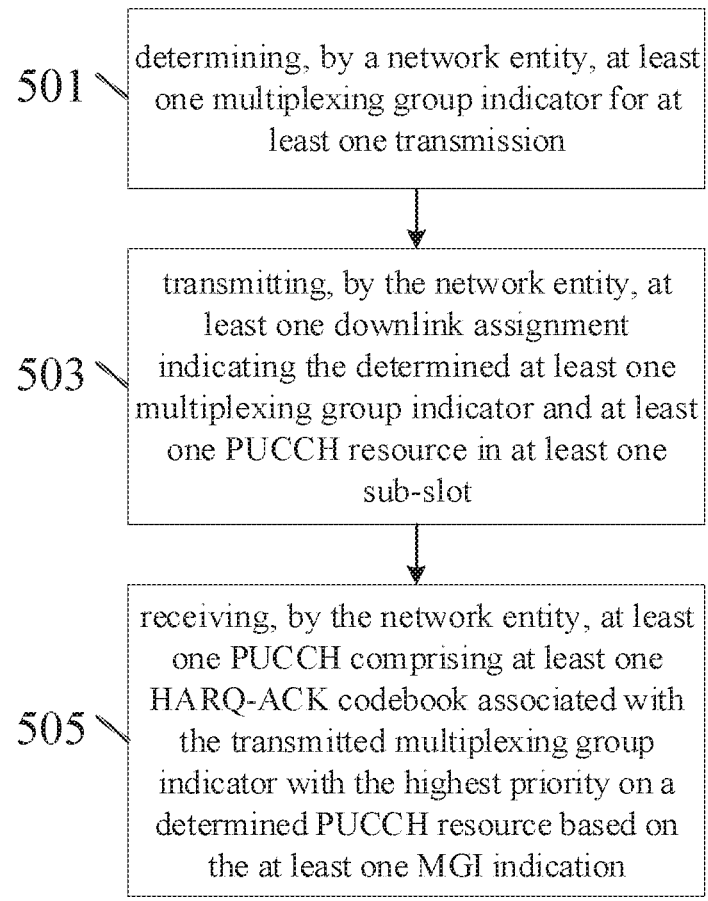
FIG. 5 illustrates an example of a method performed by a network entity according to certain embodiments.

FIG. 5 illustrates an example of a method performed by a network entity, such as network entity 920 illustrated in FIG. 9, according to certain embodiments. In step 501, the network entity may determine at least one multiplexing group indicator for at least one transmission. In step 503, the network entity may, upon determining the at least one multiplexing group indicator, transmit at least one downlink assignment indicating the determined at least one multiplexing group indicator and at least one PUCCH resource in at least one sub-slot. In some embodiments, the indication may be associated with an uplink grant. Alternatively, the indication may be associated with a downlink assignment. In step 505, the network entity may receive at least one PUCCH comprising at least one HARQ-ACK codebook associated with the transmitted multiplexing group indicator with the highest priority on a determined PUCCH resource based on the at least one MGI indication. In certain embodiments, the determination may be associated with a first traffic type and a second traffic type.

Figure 6:
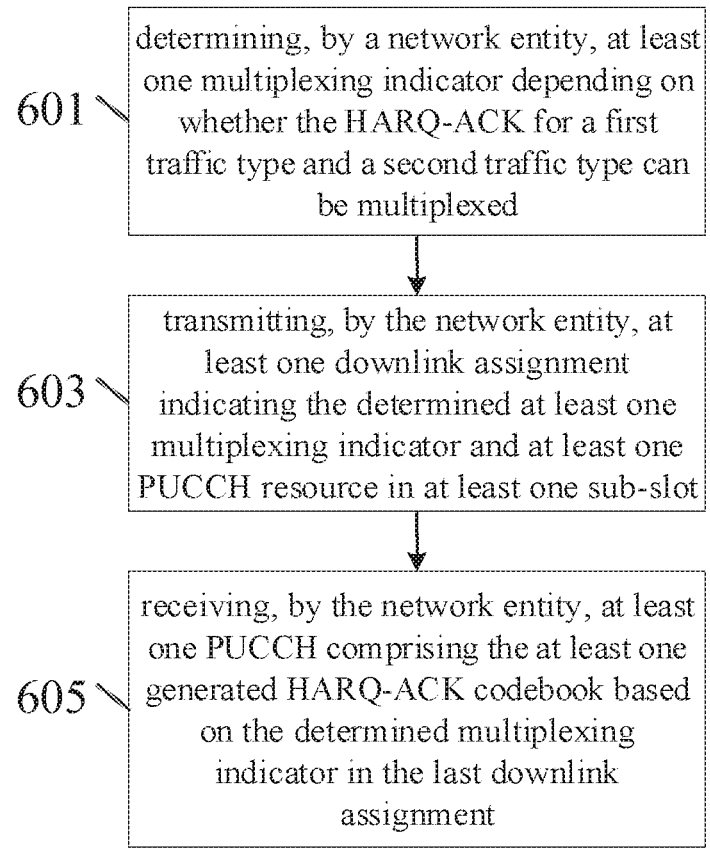
FIG. 6 illustrates another example of a method performed by a network entity according to certain embodiments.

FIG. 6 illustrates an example of a method performed by a network entity, such as network entity 920 illustrated in FIG. 9, according to certain embodiments. In step 601, the network entity may determine at least one multiplexing indicator depending on whether the HARQ-ACK for a first traffic type and a second traffic type can be multiplexed. In step 603, the network entity may transmit at least one downlink assignment indicating the determined at least one multiplexing indicator and at least one PUCCH resource in at least one sub-slot. In step 605, the network entity may receive at least one PUCCH comprising the at least one generated HARQ-ACK codebook based on the determined multiplexing indicator in the last downlink assignment.

In certain embodiments, the determination may be associated with a first traffic type and a second traffic type.

Figure 7A:
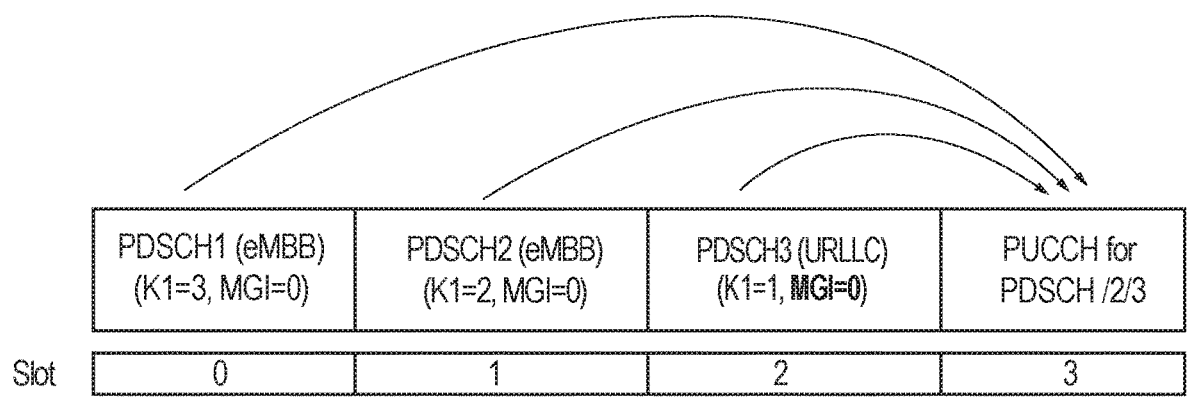
FIG. 7A and FIG. 7B illustrate another example of dynamic multiplexing of URLLC and eMBB HARQ-ACK using a multiplexing group indicator (MGI) with a slot-based HARQ-ACK feedback procedure according to certain embodiments.
Figure 7B:
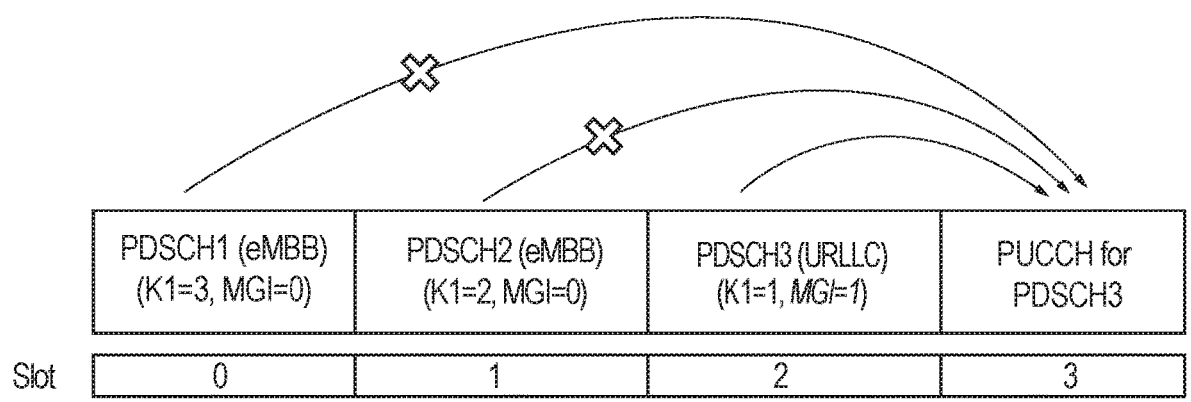

FIG. 7A and FIG. 7B illustrate another example of dynamic multiplexing of URLLC and eMBB HARQ-ACK using MGI with slot-based HARQ-ACK feedback procedure according to certain embodiments. In some embodiments, a HARQ-ACK procedure for both URLLC and eMBB may follow a slot-based approach. For example, one or more bits may be added in each DL assignment as the MGI. For all the DL assignments that indicate the PUCCH resource in the same slot and the same MGI, the HARQ-ACK bits for these PDSCHs may be multiplexed on the same PUCCH or PUSCH. In case there are multiple PUCCHs for HARQ-ACK in the same slot corresponding to different MGIs, prioritization may be necessary if the UE cannot transmit all the PUCCHs simultaneously. For example, PUCCH carrying URLLC HARQ-ACK (given by MGI=1) may be prioritized over PUCCH carrying eMBB HARQ-ACK (MGI=0).

In FIGS. 7(a) and 7(b), 3 PDSCHs may be scheduled that indicate a PUCCH resource in the same sub-slot. K1 is associated with a HARQ-ACK feedback delay relative to the end of PDSCH transmission in unit of slots. PDSCH1 and PDSCH2 for eMBB are illustrated as being scheduled with MGI of 0. When PDSCH3 is scheduled in FIG. 7A, MGI is indicated as 0. Thus, the HARQ-ACK bits for all 3 PDSCHs may be multiplexed together and transmitted on a PUCCH (or PUSCH). In contrast, FIG. 7B illustrates PDSCH3 being scheduled with MGI of 1, which means that the UE may generate a separate HARQ-ACK codebook for PDSCH3 to be transmitted on one PUCCH, with another HARQ-ACK codebook for PDSCH1/2 being transmitted on another PUCCH. The PUCCH resources for PDSCH1/2 and PDSCH3 may overlap in time, and the UE may only transmit one PUCCH at a time. Thus, PUCCH for PDSCH3 HARQ-ACK may be transmitted, while PUCCH for PDSCH1/2 HARQ-ACK may be dropped. A higher priority of the HARQ-ACK information may be given by a larger multiplexing group indicator, for example MGI=1 having priority over MGI=0, in case multiplexing of the HARQ-ACK bits of different traffic types is not performed.

Figure 8A:
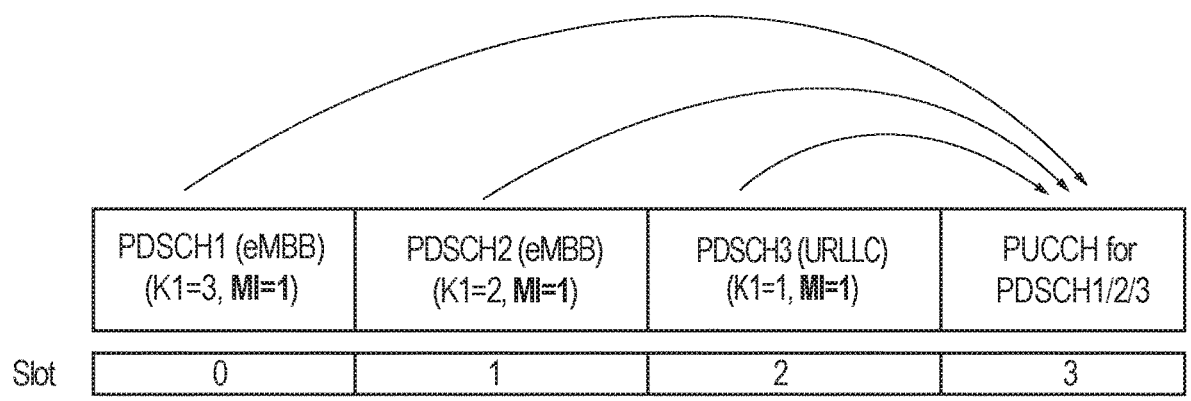
FIG. 8A and FIG. 8B illustrate another example of dynamic multiplexing of URLLC and eMBB HARQ-ACK using a multiplexing indicator (MI) with a slot-based HARQ-ACK feedback procedure according to certain embodiments.
Figure 8B:
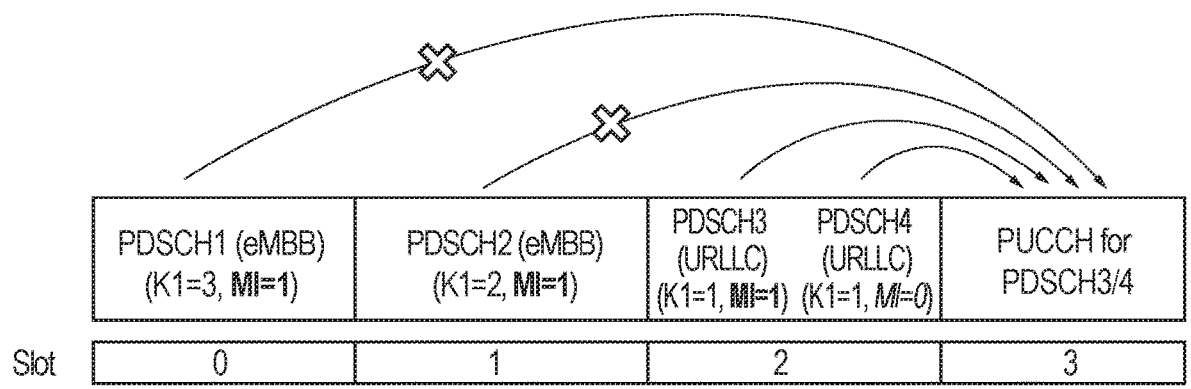

FIG. 8A and FIG. 8B illustrate another example of dynamic multiplexing of URLLC and eMBB HARQ-ACK using MI with slot-based HARQ-ACK feedback procedure according to certain embodiments. In some embodiments, a HARQ-ACK procedure for both URLLC and eMBB may follow a slot-based approach with a separate mechanism for URLLC and eMBB traffic differentiation. For example, the traffic differentiation may be done either explicitly in DCI, or implicitly by other means. One bit, illustrated as a multiplexing indicator (MI) in FIG. 8A and FIG. 8B, may be added in the DL assignment to indicate whether URLLC and eMBB HARQ-ACK bits are multiplexed or not. For example, bit '0' may mean that they are not multiplexed, while bit '1' may mean that they are multiplexed. The MI bit value in the last DL assignment that indicates the PUCCH resource in the slot determines the final status whether to multiplex or not. Thus, the network entity may change the bit and the related multiplexing (yes/no) until the scheduling decision of the last PDSCH with the PUCCH resource pointing to the same slot.

For example, the user equipment may generate and/or maintain at least one HARQ-ACK codebook separately for URLLC and eMBB traffic for each slot, based on the URLLC and eMBB traffic differentiation. When the UE receives the last DL assignment indicating the PUCCH resource in the slot, it checks the multiplexing indicator (MI) in that DCI to determine whether to multiplex the HARQ-ACK bits for URLLC and eMBB. If the MI indicates that multiplex is to be performed, such as MI=1, all of the HARQ-ACK bits may be multiplexed together and transmitted using the indicated PUCCH resource or transmitted on PUSCH.

If the MI indicates that multiplex is not to be performed, such as MI=0, based on the network entity indication of a needed prioritization of URLLC HARQ-ACK, the user equipment may drop the eMBB HARQ-ACK and only transmit the URLLC HARQ-ACK in the slot on PUCCH or PUSCH. For the two eMBB PDSCHs (PDSCH1 and PDSCH2) and the first URLLC PDSCH (PDSCH3), the MI may be set to 1, assuming the network entity considers the multiplexing performance as acceptable. In case no further PDSCH is transmitted requiring HARQ-ACK feedback, FIG. 8A, the HARQ-ACK of the two eMBB PDSCHs (PDSCH1 and PDSCH2) and the HARQ-ACK of the URLLC PDSCH (PDSCH3) may be multiplexed together on PUCCH (or PUSCH) in slot 3. When the network entity schedules another URLLC PDSCH4 as in FIG. 8B, the network entity may set MI=0 in order to prevent multiplexing of URLLC and eMBB HARQ-ACK, for example, because the overall payload size exceeds a certain threshold. Thus, in FIG. 8B, the UE may drop the HARQ-ACK of MBB, as illustrated by the cross-out HARQ-ACK mapping, and may only map the HARQ-ACK of the URLLC PDSCHs (PDSCH 3 and PDSCH4) on the PUCCH (or PUSCH) in slot 3.

FIG. 9 illustrates an example of a system according to certain embodiments. In one embodiment, a system may include multiple devices, such as, for example, user equipment 910 and network entity 920.

User equipment 910 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 920 may be one or more of a base station, such as an evolved node B (eNB) or next generation node B (gNB), a next generation radio access network (NG RAN), a serving gateway, a server, and/or any other access node or combination thereof.

In some embodiments, user equipment 910 and network entity 920 may be a part of a relay node. Multiple relays may be chained together to form a multi-hop-relay network in a relay deployment. Furthermore, a citizens broadband radio service (CBRS) device (CBSD) may include one or more serving cells, such as user equipment 910 and network entity 920.

One or more of these devices may include at least one processor, respectively indicated as 911 and 921. At least one memory may be provided in one or more of devices indicated at 912 and 922. The memory may be fixed or removable. The memory may include computer program instructions or computer code contained therein. Processors 911 and 921 and memory 912 and 922 or a subset thereof, may be configured to provide means corresponding to the various blocks of FIGS. 1-8. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 9, transceivers 913 and 923 may be provided, and one or more devices may also include at least one antenna, respectively illustrated as 914 and 924. The device may have many antennas, such as an array of antennas configured for multiple input multiple output (MIMO) communications, or multiple antennas for multiple radio access technologies. Other configurations of these devices, for example, may be provided.

Transceivers 913 and 923 may be a transmitter, a receiver, or both a transmitter and a receiver, or a unit or device that may be configured both for transmission and reception.

Processors 911 and 921 may be embodied by any computational or data processing device, such as a central processing unit (CPU), application specific integrated circuit (ASIC), or comparable device. The processors may be implemented as a single controller, or a plurality of controllers or processors.

Memory 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-8). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-8. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
ACK Acknowledgement
BW Bandwidth
BWP Bandwidth Part
CG Configured Grant
COT Channel Occupancy Time
DCI Downlink Control Information
eMBB Enhanced Mobile Broadband
eNB Evolved Node B
EPC Evolved Packet Core
GC-PDCCH Group-Common Physical Downlink Control Channel
gNB Next Generation eNB
GPS Global Positioning System
HARQ Hybrid Automatic Repeat Request
LTE Long-Term Evolution
MCS Modulation and Coding Scheme
MME Mobility Management Entity
MTC Machine-Type Communications
NDI New Data Indicator
PDCCH Physical Downlink Control Channel
PDCP Packet Data Convergence Protocol
PDSCH Physical Downlink Shared Channel
PDU Protocol Data Unit
PRB Physical Resource Block
PUCCH Physical Uplink Control Channel
PUSCH Physical Uplink Shared Channel
RAN Radio Access Network
RLC Radio Link Control
SFI Slot Format Indicator
UCI Uplink Control Information
UE User Equipment
UM Unacknowledged Mode
URLLC Ultra-Reliable and Low-Latency Communication
WLAN Wireless Local Area Network According to a first embodiment, a method may include receiving, by a user equipment, at least one downlink assignment indicating at least one multiplexing group indicator. The method may further include generating, by the user equipment, at least one hybrid automatic repeat request acknowledgement codebook in a sub-slot for each received multiplexing group indicator value. The method may further include determining, by the user equipment, whether more than one PUCCH resource associated with more than one multiplexing group indicator overlaps in time. The method may further include transmitting, by the user equipment, the highest priority codebook on the determined PUCCH resource and preventing, by the user equipment, transmission of the lower-priority HARQ-ACKs based on the at least one MGI indication in case an overlap in time has been determined. The method may further include transmitting, by the user equipment, the generated codebook on the determined PUCCH resource if there has not been any overlap in time determined of codebooks of more than one multiplexing group indicator.

In some embodiments, the first traffic type may be URLLC, and the second traffic type may be eMBB.

According to a second embodiment, a method may include receiving, by the user equipment, at least one downlink assignment indicating at least one multiplexing indicator and at least one PUCCH resource in at least one sub-slot. The method may further include determining, by the user equipment, based on the multiplexing indicator of the last received downlink assignment, if the HARQ-ACK bits of a first traffic type and second traffic type are to be multiplexed. The method may further include, in response to determining that the HARQ-ACK bits of the first traffic type and second traffic type are not to be multiplexed, generating, by the user equipment, at least one HARQ-ACK codebook associated with the HARQ-ACK bits of the first traffic type. The method may further include, in response to determining that the HARQ-ACK bits of the first traffic type and second traffic type are to be multiplexed, generating, by the user equipment, at least one HARQ-ACK codebook associated with the HARQ-ACK bits of the first traffic type and the second traffic type. The method may further include transmitting, by the user equipment, at least one PUCCH comprising the at least one generated HARQ-ACK codebook.

In some embodiments, the first traffic type may be URLLC, and the second traffic type may be eMBB.

In a variant, the method may further include a first determined indicator configured to cause all HARQ-ACK bits to be multiplexed together and/or transmitted on PUSCH or using the indicated PUCCH resource.

In a variant, the method may further include a second determined indicator configured to cause the eMBB HARQ-ACK to be dropped and/or only transmit the URLLC HARQ-ACK in the sub-slot on PUCCH or PUSCH.

According to a third embodiment, a method may include determining, by a network entity, at least one multiplexing group for at least one transmission. The method may further include transmitting, by the network entity, at least one downlink assignment indicating the determined at least one multiplexing group indicator and at least one PUCCH resource in at least one sub-slot. The method may further include receiving, by the network entity, at least one PUCCH comprising at least one HARQ-ACK codebook associated with the transmitted multiplexing group indicator with the highest priority on a determined PUCCH resource based on the at least one MGI indication.

In some embodiments, the first traffic type may be URLLC, and the second traffic type may be eMBB.

According to a fourth embodiment, a method may include determining, by a network entity, at least one multiplexing indicator depending on whether the HARQ-ACK for a first traffic type and a second traffic type can be multiplexed. The method may further include transmitting, by the network entity, at least one downlink assignment indicating the determined at least one multiplexing indicator and at least one PUCCH resource in at least one sub-slot. The method may further include receiving, by the network entity, at least one PUCCH comprising the at least one generated HARQ-ACK codebook based on the determined multiplexing indicator in the last downlink assignment.

In some embodiments, the first traffic type may be URLLC, and the second traffic type may be eMBB.

According to a fifth embodiment, a sixth embodiment, a seventh embodiment, and an eighth embodiment, an apparatus can include at least one processor and at least one memory and computer program code. The at least one memory and the computer program code can be configured to, with the at least one processor, cause the apparatus at least to perform a method according to the first embodiment, the second embodiment, the third embodiment, the fourth embodiment, and any of their variants.

According to a ninth embodiment, a tenth embodiment, an eleventh embodiment, and a twelfth embodiment, an apparatus can include means for performing the method according to the first embodiment, the second embodiment, the third embodiment, the fourth embodiment, and any of their variants.

According to an thirteenth embodiment, a fourteenth embodiment, fifteenth embodiment, and a sixteenth embodiment, a computer program product may encode instructions for performing a process including a method according to the first embodiment, the second embodiment, the third embodiment, the fourth embodiment, and any of their variants.

According to a seventeenth embodiment, an eighteenth embodiment, a nineteenth embodiment, and a twentieth embodiment, a non-transitory computer-readable medium may encode instructions that, when executed in hardware, perform a process including a method according to the first embodiment, the second embodiment, the third embodiment, the fourth embodiment, and any of their variants.

According to a twenty-first embodiment, a twenty-second embodiment, a twenty-third embodiment, and a twenty-fourth embodiment, a computer program code may include instructions for performing a method according to the first embodiment, the second embodiment, the third embodiment, the fourth embodiment, and any of their variants.

According to a twenty-fifth embodiment, a twenty-sixth embodiment, a twenty-seventh embodiment, and a twenty-eighth embodiment, an apparatus may include circuitry configured to perform a process including a method according to the first embodiment, the second embodiment, the third embodiment, the fourth embodiment, and any of their variants.

What is claimed is:

1. A method, comprising:
receiving, by a user equipment, at least one downlink assignment indicating at least one hybrid automatic repeat request acknowledgement multiplexing indicator and indicating at least one physical uplink control channel resource contained in at least one sub-slot;
determining, based on the hybrid automatic repeat request acknowledgement multiplexing indicator of the last received downlink assignment, if hybrid automatic repeat request acknowledgement bits of a first traffic type and a second traffic type are to be multiplexed or not;
generating at least one hybrid automatic repeat request acknowledgement codebook associated with the hybrid automatic repeat request acknowledgement bits of the first traffic type or the first traffic type and the second traffic type in response to determining that the hybrid automatic repeat request acknowledgement bits of the first traffic type and the second traffic type are to be multiplexed or not; and transmitting at least one physical uplink control channel comprising the at least one generated hybrid automatic repeat request acknowledgement codebook.

2. The method according to claim 1,
wherein the codebook is associated with the hybrid automatic repeat request acknowledgement bits of the first traffic type in response to determining that the hybrid automatic repeat request acknowledgement bits of the first traffic type and the second traffic type are not to be multiplexed; and
wherein the codebook is associated with the hybrid automatic repeat request acknowledgement bits of the first traffic type and the second traffic type in response to determining that the hybrid automatic repeat request acknowledgement bits of the first traffic type and the second traffic type are to be multiplexed.

3. The method according to claim 1, wherein the first traffic type is ultra-reliable low latency communication, and the second traffic type is enhanced mobile broadband.

4. The method according to claim 1, wherein the multiplexing indicator is configured to cause all hybrid automatic repeat request acknowledgement bits to be multiplexed together.

5. The method according to claim 1, wherein the multiplexing indicator is configured to cause all hybrid automatic repeat request acknowledgement bits to be transmitted on physical uplink shared channel or using the indicated physical uplink control channel resource.

6. The method according to claim 1, wherein the multiplexing indicator is configured to cause the hybrid automatic repeat request acknowledgement bits of the second traffic type to be dropped.

7. The method according to claim 1, wherein the multiplexing indicator is configured to cause to transmit the hybrid automatic repeat request acknowledgement bits of the first traffic type in the sub-slot on physical uplink control channel or physical uplink shared channel.

8. An apparatus, comprising:
at least one memory comprising computer program code;
at least one processor; and
wherein the at least one memory and the computer program code are configured, with the at least one processor, to cause the apparatus at least to:
receive at least one downlink assignment indicating at least one hybrid automatic repeat request acknowledgement multiplexing indicator and indicating at least one physical uplink control channel resource contained in at least one sub-slot;
determine, based on the hybrid automatic repeat request acknowledgement multiplexing indicator of the last received downlink assignment, if hybrid automatic repeat request acknowledgement bits of a first traffic type and a second traffic type are to be multiplexed or not;
generate at least one hybrid automatic repeat request acknowledgement codebook associated with the hybrid automatic repeat request acknowledgement bits of the first traffic type or the first traffic type and the second traffic type in response to determining that the hybrid automatic repeat request acknowledgement bits of the first traffic type and the second traffic type are not to be multiplexed or not; and
transmit at least one physical uplink control channel comprising the at least one generated hybrid automatic repeat request acknowledgement codebook.

9. The apparatus according to claim 8,
wherein the codebook is associated with the hybrid automatic repeat request acknowledgement bits of the first traffic type in response to determining that the hybrid automatic repeat request acknowledgement bits of the first traffic type and the second traffic type are not to be multiplexed; and
wherein the codebook is associated with the hybrid automatic repeat request acknowledgement bits of the first traffic type and the second traffic type in response to determining that the hybrid automatic repeat request acknowledgement bits of the first traffic type and the second traffic type are to be multiplexed.

10. The apparatus according to claim 8, wherein the first traffic type is ultra-reliable low latency communication, and the second traffic type is enhanced mobile broadband.

11. The apparatus according to claim 8, wherein the multiplexing indicator is configured to cause all hybrid automatic repeat request acknowledgement bits to be multiplexed together.

12. The apparatus according to claim 8, wherein the multiplexing indicator is configured to cause all hybrid automatic repeat request acknowledgement bits to be transmitted on physical uplink shared channel or using the indicated physical uplink control channel resource.

13. The apparatus according to claim 8, wherein the multiplexing indicator is configured to cause the hybrid automatic repeat request acknowledgement bits of the second traffic type to be dropped.

14. The apparatus according to claim 8, wherein the multiplexing indicator is configured to cause to transmit the hybrid automatic repeat request acknowledgement bits of the first traffic type in the sub-slot on physical uplink control channel or physical uplink shared channel.

15. An apparatus, comprising:
at least one memory comprising computer program code; and
at least one processor;
wherein the at least one memory and the computer program code are configured, with the at least one processor, to cause the apparatus at least to:
determine at least one hybrid automatic repeat request acknowledgement multiplexing indicator depending on whether the hybrid automatic repeat request acknowledgement for a first traffic type and a second traffic type can be multiplexed or not; and
transmit at least one downlink assignment indicating the determined at least one hybrid automatic repeat request acknowledgement multiplexing indicator, and indicating at least one physical uplink control channel resource in at least one sub-slot.

16. The apparatus according to claim 15, wherein the at least one memory and computer program code are further configured, with the at least one processor, to cause the apparatus at least to:
receive at least one physical uplink control channel comprising at least one generated hybrid automatic repeat request acknowledgement codebook based on the determined hybrid automatic repeat request acknowledgement multiplexing indicator in the last downlink assignment.

17. The apparatus according to claim 15, wherein the first traffic type is ultra-reliable low latency communication, and the second traffic type is enhanced mobile broadband.

* * * * *